United States Patent [19]
Hosoya et al.

[11] Patent Number: 5,990,182
[45] Date of Patent: Nov. 23, 1999

[54] POLYMER PACKING MATERIAL FOR LIQUID CHROMATOGRAPHY AND A PRODUCING METHOD THEREOF

[75] Inventors: Ken Hosoya, Kyoto; Yutaka Ohtsu, Yokohama; Osamu Shirota, Yokohama; Tomohiko Kimura, Yokohama, all of Japan

[73] Assignee: Shiseido Company, Ltd., Tokyo, Japan

[21] Appl. No.: 09/153,677

[22] Filed: Sep. 15, 1998

[30] Foreign Application Priority Data

Sep. 19, 1997 [JP] Japan .................................. 9-255553

[51] Int. Cl.⁶ ...................................................... C08J 9/28
[52] U.S. Cl. .................................. 521/62; 521/63; 521/64
[58] Field of Search .................................. 521/62, 63, 64

[56] References Cited

U.S. PATENT DOCUMENTS 5,130,343  7/1992  Frechet et al. ............................ 521/62
5,231,415  7/1993  Harris ...................................... 521/28

FOREIGN PATENT DOCUMENTS

0 57 54 88  12/1993  European Pat. Off. .
WO 9312167   6/1993  WIPO .

*Primary Examiner*—Morton Foelak
*Attorney, Agent, or Firm*—Kenyon & Kenyon

[57] ABSTRACT

A method of producing a polymer packing material for liquid chromatography includes the steps of swelling seed polymer particles to form swelled particles, polymerizing monomers in the swelled particles under existence of diluent, and removing the diluent to form porous polymer particles, wherein the step of polymerizing the monomers is conducted under existence of a compound having a conjugated double bond not reactive with the monomers and having a molecular weight of 100–500. Alternatively, the polymerization process may be conducted by an oxidation reduction polymerization process. Further, the porous polymer particles obtained after removal of the diluent may be subjected to a heat treatment process at a temperature of 100° C. or higher.

14 Claims, 7 Drawing Sheets

FIG. 7A HEAT TREATMENT

FIG. 7B NO HEAT TREATMENT

POLYMER PACKING MATERIAL FOR LIQUID CHROMATOGRAPHY AND A PRODUCING METHOD THEREOF

BACKGROUND OF THE INVENTION

The present invention generally relates to liquid chromatography and more particularly to a polymer packing material for liquid chromatography and a producing method thereof. More particularly, the present invention relates to a producing method of a polymer packing material according to a two-step or multiple step polymerization process, as well as to a polymer packing material produced according to such a process.

The packing material for high performance liquid chromatography (HPLC) is generally classified into an inorganic packing material that uses an inorganic carrier and a polymer packing material that uses an organic polymer.

In actual use, inorganic packing materials based on silica gel are used most frequently. In a reversed phase liquid chromatography, which occupies more than 60% of the separation mode of HPLC, an alkylsiliation silica gel is used primarily, in which the surface of the silica gel carrier is chemically modified.

While such conventional inorganic packing materials show an excellent separation performance and mechanical strength, there has been a drawback in the conventional packing material such as low chemical stability or appearance of undesirable secondary retention effect caused by a silanol group remaining on the silica gel surface or by a metallic impurity contained in the silica gel base.

On the other hand, the polymer packing materials have an advantageous feature of chemical stability and have been used for a packing material of size exclusion chromatography or ion exchange chromatography similarly to a silica gel packing material.

The polymer packing materials are used also in a reversed phase liquid chromatography, particularly under a separation condition in which the use of silica gel packing material is not possible. The understanding on the separation characteristic of such organic polymer packing material is increasing, and there are reports claiming that a separation characteristic superior to the separation characteristic of a silica gel packing material is obtained.

A polymer packing material is generally classified into those prepared from a natural polymer by a cross-linking process, and those synthesized by a polymerization process of a vinyl polymer.

The representative example of the former includes a packing material derived from a polysaccharide derivative such as agarose, dextran or mannan. These materials, however, generally suffers from the problem of low withstand pressure and may not be used for the packing material of HPLC.

On the other hand, the synthetic polymer packing material includes materials such as a polystyrene-divinylbenzen gel, a derivative thereof, a poly(meta)acrylate gel and a polyacrylamide gel. Among others, the polyalkylmetacrylate gel or the polystyrene-divinylbenzene gel is chemically stable and used for the packing material in the reversed phase liquid chromatography. It should be noted that these gels are stable over a wide pH range as compared with the silica gel packing material.

Such a synthetic organic polymer packing material is generally synthesized by mixing monomers together with a diluent and a cross-linking agent to cause a polymerization such that a porous structure is formed.

Thereby, fine pores are formed when a good solvent is used for the polymer to be synthesized, while large pores tend to be formed when a poor solvent is used. In other words, the pore diameter is controlled by choosing the combination of the diluent and the monomers. By using such a procedure, spherical porous polymer particles are synthesized as the polymer packing material.

On the other hand, it is known also that there are problems in such synthetic polymer packing materials. One of the problems is related to the structure of the packing material, particularly with regard to the fine pores. The other problem is related to the size distribution of the porous polymer particles forming the packing material.

More specifically, a polymer packing material generally has a double pore structure called micropore, which arises in relation to the cross-linking structure of the polymer, wherein such a micropore generally has a diameter of smaller than 2 nm.

Because of the existence of the micropores in the porous polymer particles, the extent a solute molecule can penetrate by osmosis becomes larger for small solute molecules than for a polymer solute.

Accordingly, such a polymer packing material shows a separation characteristic substantially different from that of the silica gel packing material when used for separation of a specimen in a chromatograph column. As the effect of such micropores on the resolution is not fully understood, and in view of the fact that a complete control of the micropores is difficult, the use of the polymer packing material has frequently led to a deterioration of resolution of chromatography.

When the micropores could be eliminated, the separation characteristic of a polymer packing material would be improved substantially. By eliminating the micropores, it is expected that the separation characteristic of the polymer packing material is controlled as desired. Further, the type of the specimens to which the polymer packing material is applicable is expected to increase. Further, the resolution of chromatography is expected to increase.

About the problem related to the particle size distribution of the polymer packing material, the problem arises mainly as a result of the process employed for producing the polymer packing material.

As noted previously, the polymer packing materials are produced by a suspension polymerization process. However, the polymer packing materials obtained according to such a conventional process generally have a wide spectrum of particle size, and the desired column performance is not obtained when the as-formed polymer particles are filled directly in a chromatograph column as the polymer packing material.

In order to obtain a desired column performance, it has been practiced to subject the obtained polymer particles to a classification process so as to select those polymer particles having a diameter falling in a desired range.

However, such a classification process requires a specially built facility and the cost of the packing material is increased inevitably. In addition, the classification process uses only a part of the obtained polymer particles, while the rest of the polymer particles are discarded. Thus, the yield of the polymer packing material decreases, and this also contributes to the increase of the cost of the polymer packing material.

In order to eliminate the problem of the size distribution of the polymer packing material, there is proposed a so-called two-stage polymerization process for producing the polymer packing material.

Figure 1:
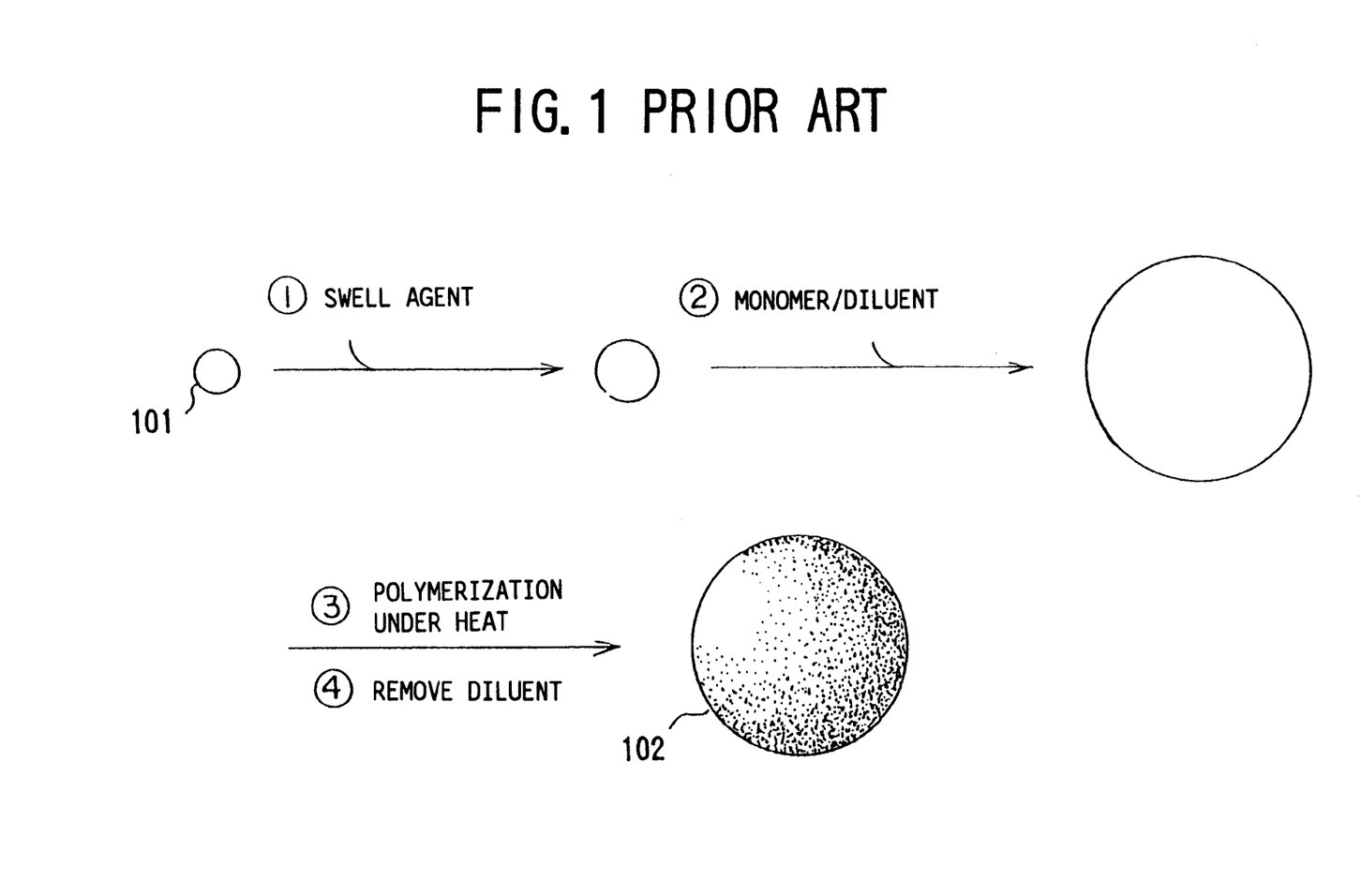
FIG. 1 is a diagram showing a conventional two-stage synthetic process of polymer packing material.

FIG. 1 shows the process of producing a polymer packing material according to such a two-stage polymerization process.

Referring to FIG. 1, seed particles 101 having a uniform particle diameter of about 1 $\mu$m are swelled by consecutively applying thereto a swelling agent in a first step (1) and a monomer in a second step (2), and the monomers in the swelled particles thus obtained are subjected to a polymerization process under heat in a third step (3) to form polymer particles 102 having a uniform diameter.

According to such a two-stage process, the uniformity of the particle diameter is maintained during the swelling process of the steps (1) and (2). Further, the polymer particles 102 are synthesized as highly polymerized particles. By using a diluent in the step (2) together with the monomers not reacting with the diluent and by removing the diluent in the polymerization process, the polymer particles 102 are formed to have a porous structure after the polymerization process.

It should be noted that the foregoing two-stage process can be carried out by a facility used conventionally for a suspension polymerization process, except for the swelling process. Thus, the desired mono dispersion particle distribution is obtained easily and with low cost for the polymer packing material.

It should be noted that the polymer particles forming the polymer packing material show a mono dispersion in the particle distribution in conformity to the particle distribution of the seed particles 101, and the classification process can be eliminated entirely. Further, the polymer packing material thus obtained show an excellent separation performance when used in a chromatograph column. In addition, the pressure loss of the polymer packing material is small and the polymer packing material can be filled stably in the chromatograph column. In addition, the separation using such a polymer packing material can be achieved at high speed.

However, such polymer packing material, although produced according to such a two-stage process, still suffers from the problem of micropores similarly to the conventional polymer packing material produced by the suspension polymerization process.

Thus, the problem of the micropores remains unsolved and hence the removal of the micropores remains as an important target of research of polymer packing material.

SUMMARY OF THE INVENTION

Accordingly, it is a general object of the present invention to provide a novel and useful polymer packing material for liquid chromatography and a producing method thereof wherein the foregoing problems are eliminated.

Another and more specific object of the present invention is to provide a polymer packing material for liquid chromatography and a producing process thereof wherein the polymer packing material forms a monodispersed system and the micropores are reduced or eliminated substantially for improved separation performance of liquid chromatography.

Another object of the present invention is to provide a method of producing a polymer packing material for liquid chromatography, comprising the steps of:

swelling polymer seeds by applying a swelling agent;

swelling said polymer seeds further by monomers and a diluent not reacting with said monomers, to form swelled particles; and polymerizing said monomers in said swelled particles to form porous polymer particles, said step of forming said porous polymer particles including a step of removing said diluent;

wherein said step of forming said swelled particles by said monomers and said diluent includes a step of adding, to said polymer seeds in addition to said monomers and said diluent, a compound not reacting with said monomers, said compound having a conjugated double bond and a molecular weight of about 100–about 500.

According to the present invention, the boiling point of the compound is set sufficiently higher for preventing dissipation of the compound from the polymerization system during the polymerization process, by setting the molecular weight of the compound to be larger than about 100. By decreasing the molecular weight to be smaller than about 500, on the other hand, a solubility to an ordinary solvent is guaranteed for the compound and the compound is easily removed together with solvent at the time of removal of the diluent. By using the compound, the micropore formation is effectively suppressed while maintaining the desired monodispersion of the particle diameter for the porous polymer particles forming the packing material. By using such a polymer packing material, the separation performance of the chromatograph column is improved substantially.

Another object of the present invention is to provide a method of producing a polymer packing material for liquid chromatography, comprising the steps of:

swelling polymer seeds by applying a swelling agent;

swelling said polymer seeds further by monomers and a diluent not reacting with said monomers, to form swelled particles; and polymerizing said monomers in said swelled particles to form porous polymer particles, said step of forming said porous polymer particles including a step of removing said diluent;

wherein said step of polymerizing said monomers is conducted by an oxidation-reduction polymerization process.

According to the present invention, the radical formation is caused in the polymerization process by an oxidation-reduction reaction. Thereby, the thermal radical formation process or thermal monomer polymerization process is eliminated, and the number of the micropores in the polymer particles is minimized successfully while simultaneously maintaining the desired monodispersion for the polymer particle diameter. By using such a polymer packing material, the separation performance of the chromatograph column is improved substantially.

Another object of the present invention is to provide a method of producing a polymer packing material for liquid chromatography, comprising the steps of:

swelling polymer seeds by applying a swelling agent;

swelling said polymer seeds further by monomers and a diluent not reacting with said monomers, to form swelled particles;

polymerizing said monomers in said swelled particles to form porous polymer particles, said step of forming said porous polymer particles including a step of removing said diluent; and applying a heat treatment process to said porous polymer particles at a temperature higher than about 100° C.

According to the present invention, the structure of the polymer particles forming the polymer packing material is changed as a result of the heating conducted at the temperature exceeding about 100° C. As such a heating process influences most significantly on the micropores that have an extremely small diameter and volume, the number of the micropores in the polymer particles is minimized successfully and preferentially as a result of such a heat treatment process while simultaneously maintaining the desired monodispersion for the polymer particle diameter. By using such a polymer packing material, the separation performance of the chromatograph column is improved substantially.

Other objects and further features of the present invention will become apparent from the following detailed description when read in conjunction with the attache drawings.

DETAILED DESCRIPTION OF THE PREFERRED EMBODIMENTS

[First Embodiment]

The present invention improves the separation performance of a chromatograph column by eliminating or minimizing the micropores from the polymer packing material filling the chromatograph column.

While the mechanism of formation of the micropores in a polymer packing material is not completely understood, the investigation by the applicants have revealed that the selection of the monomer polymerization condition influences on the polymerization step (3) of FIG. 1 and hence on the micropore formation. Thus, the micropore formation can be suppressed by appropriately selecting the polymerization condition.

More specifically, it was discovered that the micropore formation is effectively suppressed by changing the condition of the monomer polymerization process, which has conventionally been conducted by a thermal polymerization process under existence of a polymerization initiator.

For example, it was discovered that the control of the monomer polymerization speed is quite effective for minimizing the micropore formation. Such a control of the monomer polymerization speed may be achieved by controlling the amount of the radicals that are released by the polymerization initiator and contributing to the monomer polymerization.

Thus, it was discovered that the micropore formation in a polymer packing material is effectively suppressed by the process steps of: swelling polymer seeds by applying a swelling agent; swelling the polymer seeds further by monomers and a diluent not reacting with the monomers, to form swelled particles; and polymerizing the monomers in the swelled particles to form porous polymer particles, the step of forming the porous polymer particles including a step of removing the diluent; wherein the step of forming the swelled particles by the monomers and the diluent includes a step of adding, to the polymer seeds in addition to the monomers and the diluent, a compound not reacting with the monomers, the compound having a conjugated double bond and a molecular weight of about 100–about 500.

By doing so, the conjugated double bond in the molecules of the foregoing compound causes an interaction with the radicals thermally released by the polymerization initiator, wherein the interaction thus caused by the molecules of the compound controls the reactivity of the radicals to the monomers and hence the polymer structure obtained. In order that the foregoing mechanism to work, the compound has to contain a conjugated double bond inside the molecule. The compound should have a molecular weight in the range of about 100 to about 500. The compound should not react with the monomers that cause the polymerization.

By setting the molecular weight of the compound to be larger than about 100, the boiling point of the compound is set sufficiently higher for preventing dissipation from the polymerization system during the polymerization process. By decreasing the molecular weight to be smaller than about 500, on the other hand, a solubility to an ordinary solvent is guaranteed for the compound and the compound is easily removed together with solvent at the time of removal of the diluent.

It should be noted, however, that a compound having a molecular weight larger than 500 may be used also, as long as a sufficient solubility to the used solvent is maintained and as long as the compound causes the interaction with the radicals and is removable by the solvent.

In any event, the compound should, while causing the desired interaction with the radicals, not react with the monomers, as such a reaction causes a decrease of the monomers used for the formation of the polymer packing material and hence a deviation from the optimum reaction condition. By selecting the foregoing compound from a group of compounds that do not react with the monomers, one obtains an additional advantageous feature in that the unreacted compound is easily removed at the time of removal of the diluent after the polymerization process of the monomers.

For the compound to be added in the polymerization process, one may use an aromatic hydrocarbon or an aromatic hydrocarbon having a substituent.

The aromatic hydrocarbon for the purpose of the present invention may include naphthalene, anthracene, pyrene, and the like. As for the aromatic hydrocarbon having substituent, one may use a naphthalene skeleton, anthracene skeleton, pyrene skeleton and also a benzene skeleton for the aromatic hydrocarbon part of the compound. This means that it is possible to use a substitute aromatic hydrocarbon having a benzene skeleton as in the case of biphenyl or terphenyl.

As to the substituent of the aromatic hydrocarbon, any substituent may be used as long as it does not react or bond with the polymerization initiator or the monomers. Within this limitation, any substituent may be used such as a saturated hydrocarbon group, an aryl group as in the case of biphenyl, a halogen group, or a substituent containing a heteroatom.

[Second Embodiment]

Another method effective for suppressing the micropore formation in the polymer packing material is to conduct the monomer polymerization of the swelled particles without using the conventional monomer polymerization process, which relies upon thermally formed radicals and is generally conducted under heat.

More specifically, the monomer polymerization process may be conducted by using the radicals that are formed by an oxidation-reduction reaction. By using such an oxidation-reduction reaction, the micropore formation in the polymer packing material is effectively suppressed.

When a reductant is added to the polymerization initiator, it should be noted that the activation energy of the decomposing reaction is reduced and the formation of the activated radicals is facilitated substantially. In other words, the polymerization process proceeds under low temperature when the radical formation is conducted by the oxidation-reduction reaction.

For example, $RO^{\bullet}$ is formed by adding $Fe^{2+}$ to hydroperoxide ROOH.

For the reductant, it is also possible to use a metallic ion in the reduction state, such as $Cu^+$, $Cr^+$ or $Ti^+$.

When the use of such a metallic ion is not preferable, as in the case of the metallic ions in the polymer packing material may cause a problem in the separation or analysis of the specimen which is conducted after the chromatography, it is possible to use amines for the reductant.

[Third Embodiment]

Further, the applicants have discovered that the micropores can be reduced after the monomer polymerization process, by conducting a heat treatment process. By conducting the heat treatment process after the monomer polymerization process, the micropores formed already are eliminated or reduced.

It is believed that such a heat treatment process induces a change in the porous structure of the polymer particles.

More specifically, it is believed that the micropores, having a very small size and volume, are most heavily influenced by the heat treatment process, and the number of the micropores in the polymer packing material is reduced substantially as a result of the heating process. During such a structural change of the polymer particles, it should be noted that the monodispersion particle diameter distribution and the fine pore structure are maintained.

The foregoing heat treatment process is most preferably conducted after the step of removal of the diluent for forming the porous polymer particles.

Preferably, the heat treatment process is conducted at the temperature of about 100° C. for a specific polymer in order to maximize the separation performance in a chromatography carried out in a chromatograph column. In order to ensure the foregoing effect of reduction of the micropores for a wide variety of the polymers, it is preferable to conduct the heat treatment process at a temperature of about 200° C. or more.

It should be noted that the foregoing process of reducing the micropores by the heat treatment process is applicable also to the process of the first or second embodiment described previously. Thus, the process of the present embodiment may be combined with the process of the first embodiment or second embodiment.

[Experiment 1]

In the present experiment, a polymer packing material for liquid chromatography was synthesized according to the process of the first embodiment by adding a compound not reacting with the monomer and having a conjugated double bond and a molecular weight of about 100 to about 500, to the swelling process of the polymer seed.

Figure 2:
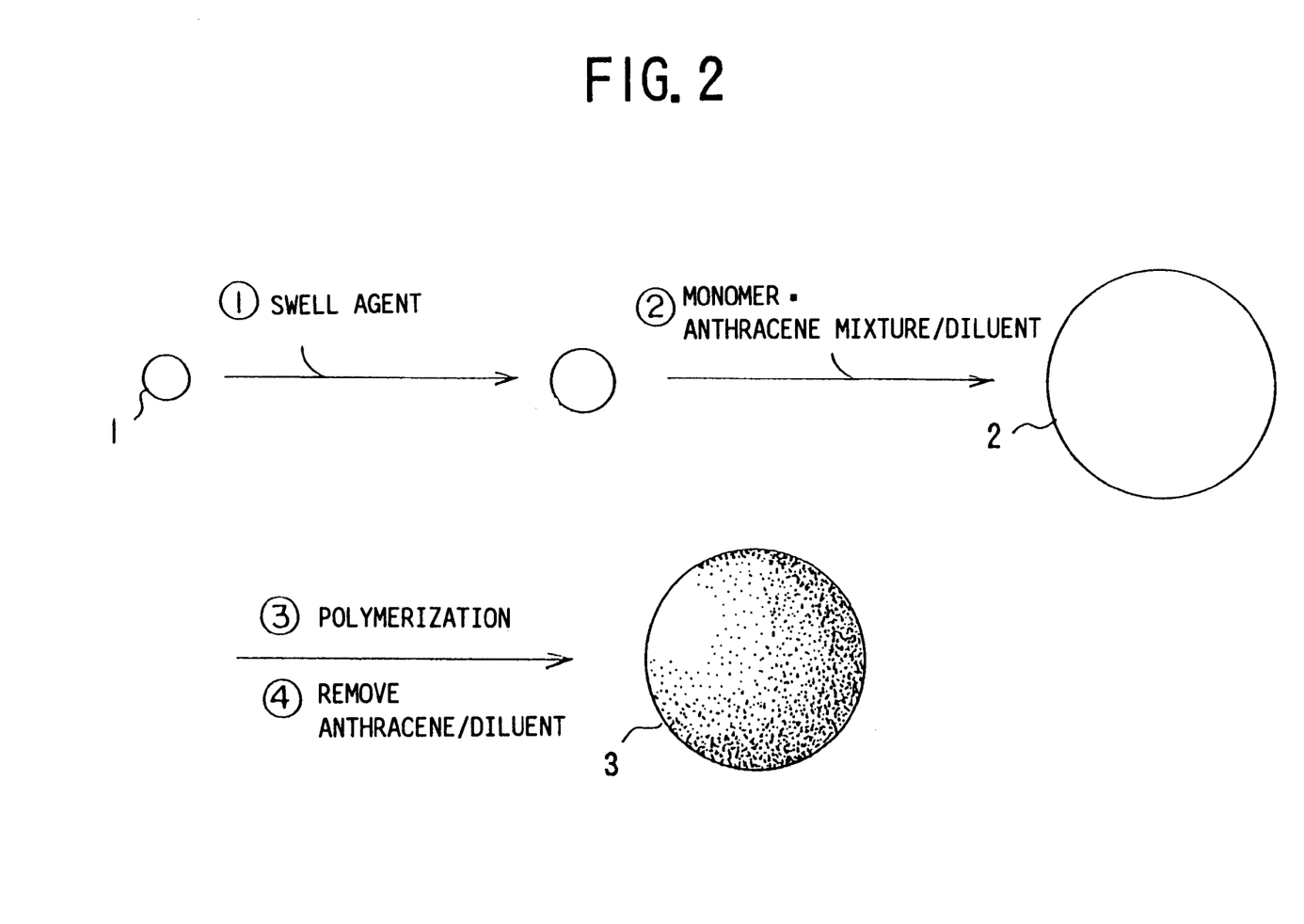
FIG. 2 is a diagram showing the process of producing a polymer packing material for liquid chromatography according to a first embodiment of the present invention.

FIG. 2 shows the process of producing the polymer packing material for liquid chromatography.

Referring to FIG. 2, a number of polymer seed particles 1, each having a diameter of about 1 μm, are formed by a soap-free polymerization process and swelled by a swelling agent.

Next, the swelled particles are swelled further in a solution containing ethylene diacrylate, a diluent not reacting with ethylene diacrylate, anthracene, and benzoil peroxide, to form a number of swelled particles 2 each having a diameter of about 5 μm. Thereby, ethylene diacrylate acts as the monomers while anthracene acts as the compound having a conjugated double bond therein and a molecular weight of about 100–about 500. It should be noted that anthracene does not react ethylene diacrylate. Further, benzoil peroxide acts as a polymerization initiator.

Next, the mixture thus obtained is heated to a temperature of about 70° C. to cause a polymerization of the ethylene acrylate monomers in the swelled particles.

Finally, the diluent and anthracene are removed from the polymerized particles to form a number of porous particles 3 having a uniform diameter as the polymer packing material.

Next, a reversed phase chromatograph column is formed by filling the polymer packing material thus obtained in a column having an inner diameter of 4.6 mm and a length of 150 mm.

Figure 3:
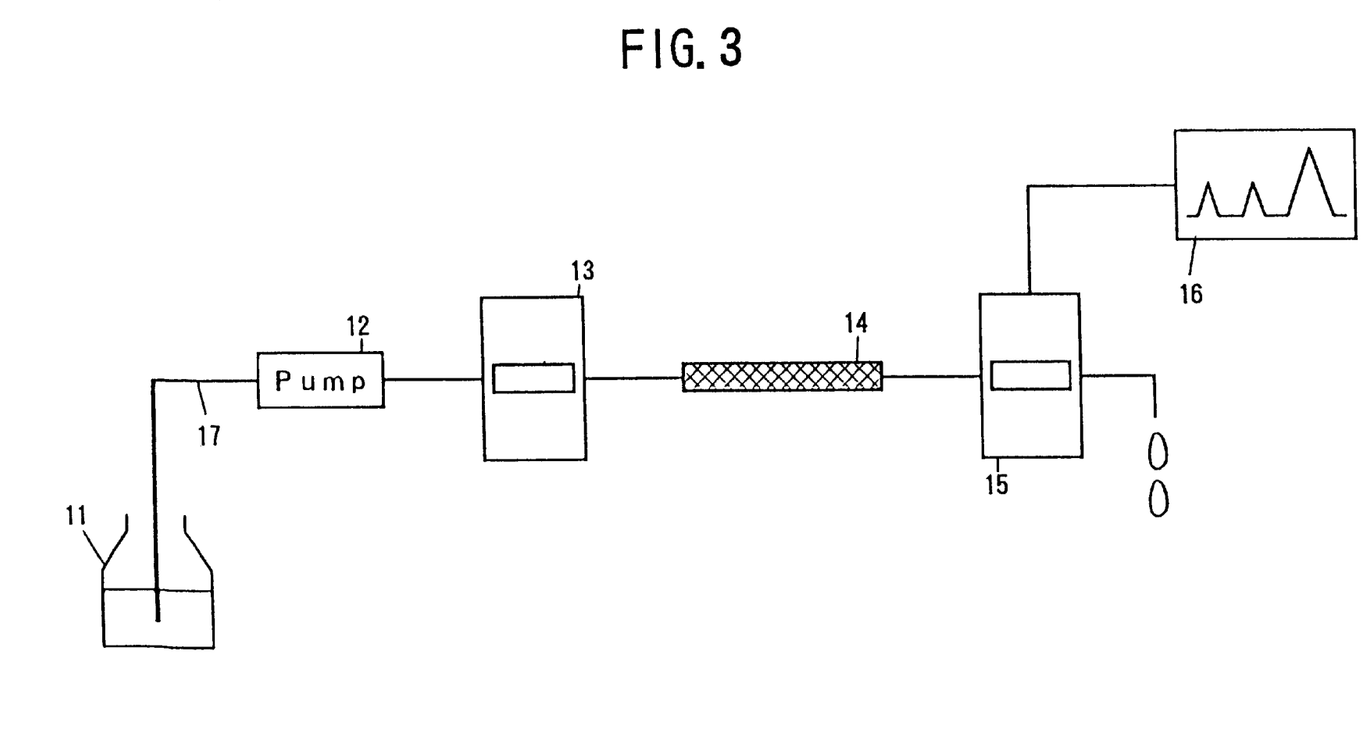
FIG. 3 is a diagram showing the construction of a liquid chromatograph used in various embodiments of the present invention.

The column thus obtained is used in a liquid chromatograph of FIG. 3 for analyzing a specimen, which contained six alkylbenzene derivatives as the components.

Referring to FIG. 3, the liquid chromatograph includes a vessel 11 filled with a mobile phase, a pump 12, a sampler 13, a column 14 corresponding to the foregoing reversed liquid chromatograph column, a detector 15, a recorder 16 and a liquid feed tube 11 connecting the foregoing various parts of the liquid chromatograph.

More specifically, the pump 2 is connected to the vessel 11 and supplies the mobile phase in the vessel 11 to the various parts of the liquid chromatograph through the tube 17 with an exactly controlled rate. Further, the sampler 13 injects the sample to the reversed phase liquid chromatograph column 14 in the state of a solution, wherein the sample thus injected is separated into individual components in the column 14 as a result of the action of the mobile phase fed by the pump 12 and the packing material in the column 14.

Each of the components thus separated is detected by the detector 15, and the result of the detection is recorded by the recorder in the form of a chromatogram. By analyzing the chromatogram thus recorded, it is possible to evaluate the resolution of the polymer packing material used in the column 14 for separating the specimen into the components.

In the present experiment, a mixture of water and an acetonitrile solvent (60% acetonitrile) was used for the mobile phase and the mobile phase was supplied with a rate of 1.0 ml/min. As noted before, the specimen analyzed by the chromatograph of FIG. 3 in the present experiment contained six alkylbenzene derivatives as the components.

In order to confirm the effect of the polymer packing material of the first embodiment, a comparative experiment was undertaken also, in which a porous packing material was synthesized according to the process similar to that of the first embodiment, except that the addition of anthracene was not made. By using the polymer packing material of the comparative experiment, the same sample was analyzed by the chromatograph of FIG. 3 under the same separation condition.

Figure 4A:
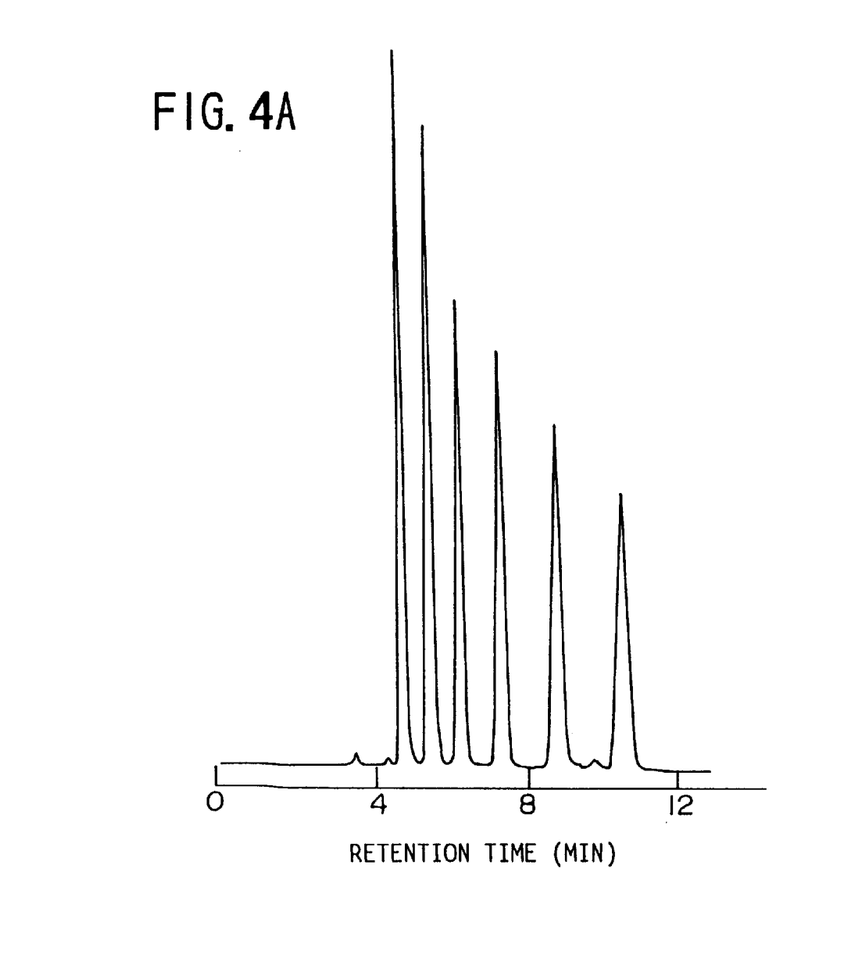
FIGS. 4A and 4B are diagrams showing the chromatogram obtained by using the packing material of the first embodiment in comparison with a chromatogram obtained by using a conventional packing material.
Figure 4B:
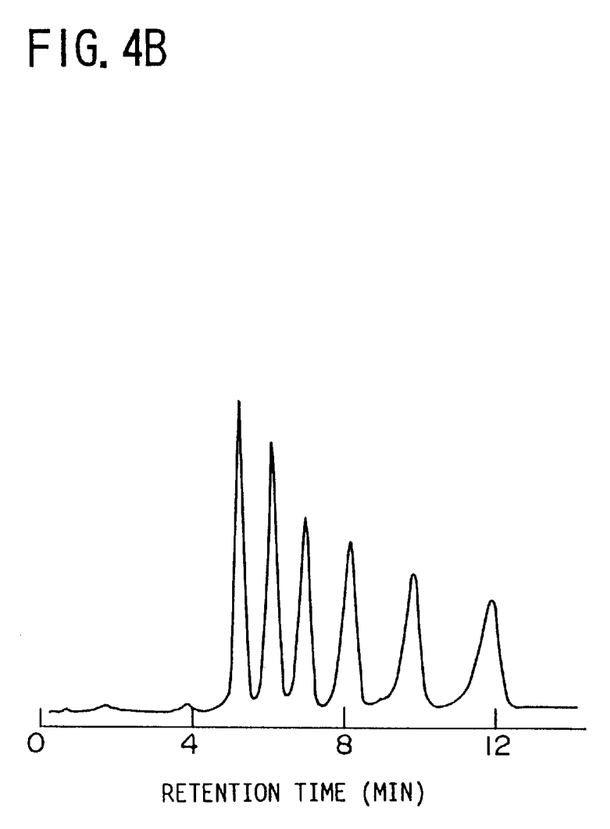

FIGS. 4A and 4B show respectively the chromatogram obtained by the present experiment and the chromatogram obtained by the comparative experiment.

Referring to FIGS. 4A and 4B, it can be seen that sharp peaks are obtained in the present experiment shown in FIG. 4A as compared with the comparative experiment shown in FIG. 4B. This clearly indicates that the resolution of chromatography is higher in the packing material of the present experiment corresponding to the first embodiment as compared with the packing material of the comparative experiment.

[Experiment 2]

In the present experiment, the polymer packing material was synthesized according to the oxidation-reduction reaction of the second embodiment.

In the present experiment, a number of polymer seed particles each having a diameter of about 1 μm are formed by a soap-free polymerization process and swelled by a swelling agent.

Next, the swelled particles are swelled further in a solution containing ethylene diacrylate, a diluent not reacting with ethylene diacrylate, and benzoil peroxide, to form a number of swelled particles 2 each having a diameter of about 5 μm. Thereby, ethylene diacrylate acts as the monomer while benzoil peroxide acts as a polymerization initiator.

Next, the mixture thus obtained is mixed with dimethyl aniline, and a polymerization of the ethylene acrylate monomers in the swelled particles is conducted by an oxidation-reduction reaction under existence of ice.

Finally, the diluent is removed from the polymerized particles to form a number of porous polymer particles having a uniform diameter as the polymer packing material.

Next, the polymer packing material thus obtained is filled in a reversed phase chromatograph column having an inner diameter of 4.6 mm and a length of 150 mm.

The column thus obtained is used in the liquid chromatograph of FIG. 3 for analyzing a specimen containing acetophenone, benzene, naphthalene, 1-phenylpentane, pyrene, and triphenylene as the components, while supplying a mixture of water and acetonitrile solvent (60% acetonitrile) as the mobile phase with a flow rate of 1.0 ml/min.

In order to confirm the effect of the polymer packing material of the first embodiment, a comparative experiment was undertaken also, in which a porous packing material was synthesized according to the process similar to that of the second embodiment, except that the polymerization was made by at 70° C. By using the polymer packing material of the comparative experiment, the same sample was analyzed by the chromatograph of FIG. 3 under the same separation condition.

Figure 5A:
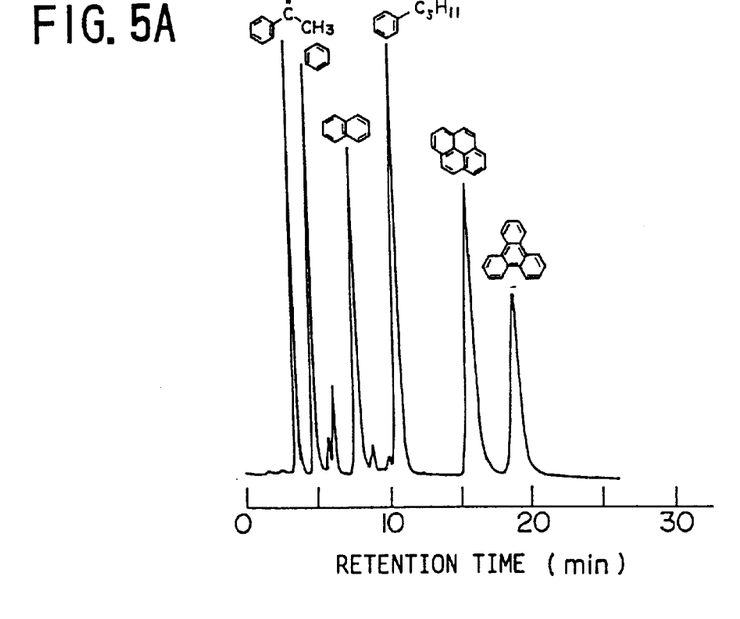
FIGS. 5A and 5B are diagrams showing the chromatogram obtained by a reversed phase liquid chromatography according to a second embodiment of the present invention in comparison with a conventional chromatogram.
Figure 5B:
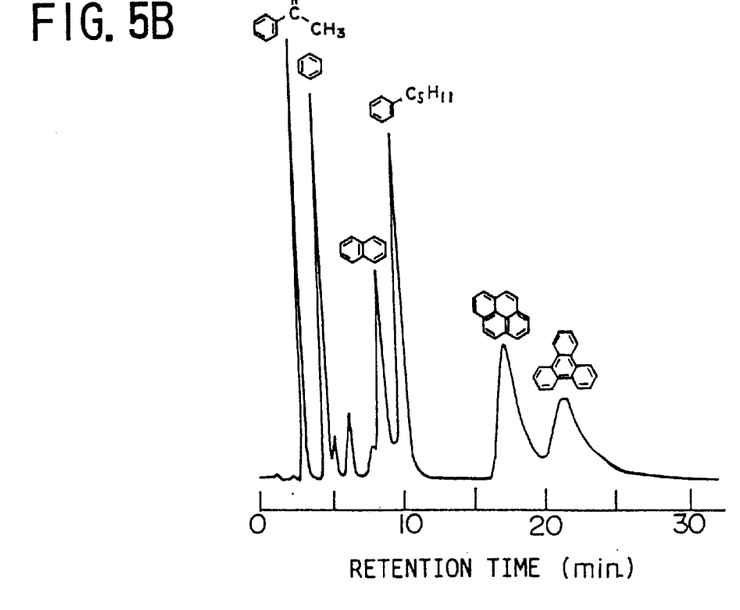

FIGS. 5A and 5B show respectively the chromatogram obtained by the present experiment and the chromatogram obtained by the comparative experiment.

Referring to FIGS. 5A and 5B, it can be seen that, although there is little difference in the solutes of weak retention characterized by a small retention time, there appears a significant difference in the shape of the peak for the solutes of strong retention characterized by a long retention time. For the solutes of strong retention, it should be noted that the shape of the peak is broad when the conventional packing material is used as indicated in FIG. 5B, while a very sharp peak is obtained when the packing material of the second embodiment is used as indicated in FIG. 5A. The result of FIG. 5A indicates that the deterioration of resolution (the number of theoretical plates) is minimized.

In summary, it is concluded that the polymer packing material obtained in the present experiment according to the second embodiment provides a substantial improvement in the resolution of liquid chromatography when used in the chromatograph column.

[Experiment 3]

In the present experiment, a polymer packing material for liquid chromatography was synthesized according to the process of the third embodiment by conducting a heat treatment at a temperature of 100° C. or more after the porous polymer particles are synthesized.

In the present experiment, a number of polymer seed particles each having a diameter of about 1 μm are formed by a soap-free polymerization process and swelled by a swelling agent.

Next, the swelled particles are swelled further in a solution containing ethylene diacrylate, a diluent not reacting with ethylene diacrylate, and benzoil peroxide, to form a number of swelled particles 2 each having a diameter of about 5 μm. Thereby, ethylene diacrylate acts as the monomers while benzoil peroxide acts as a polymerization initiator.

Next, the mixture thus obtained is heated to a temperature of about 70° C. to cause a polymerization of the ethylene acrylate monomers in the swelled particles.

After the polymerization process, the diluent is removed from the polymerized particles to form a number of porous particles having a uniform diameter.

Finally, a part of the porous polymer particles are held in a glass vessel and heated for 24 hours at 200° C., to form the desired polymer packing material. Further, the rest of the porous polymer particles are held in a glass vessel and heated also for 24 hours at 100° C.

Next, a reversed phase chromatograph column is formed by filling the polymer packing material thus obtained in a column having an inner diameter of 4.6 mm and a length of 150 mm, and a specimen was analyzed by the chromatograph of FIG. 3 while using the reversed phase chromatograph column thus obtained for the column 14. Similarly as before, the specimen contained six alkylbenzene derivatives.

In the present experiment, a mixture of water and an acetonitrile solvent (60% acetonitrile) was used for the mobile phase and the mobile phase was supplied with a rate of 1.0 ml/min.

In order to confirm the effect of the polymer packing material of the third embodiment, a comparative experiment was undertaken also, in which a porous packing material was synthesized according to the process similar to the process noted above except that the heating process after the polymerization is eliminated. By using the polymer packing material of the comparative experiment, the same sample was analyzed by the chromatograph of FIG. 3 under the same separation condition.

Figure 6A:
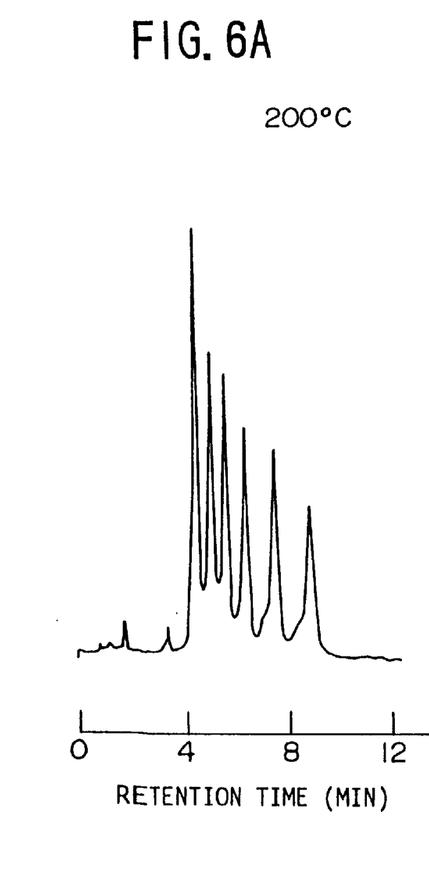
FIGS. 6A–6C are diagrams showing the chromatograms obtained by a reversed phase liquid chromatography according to a third embodiment of the present invention in comparison with a conventional chromatogram.
Figure 6B:
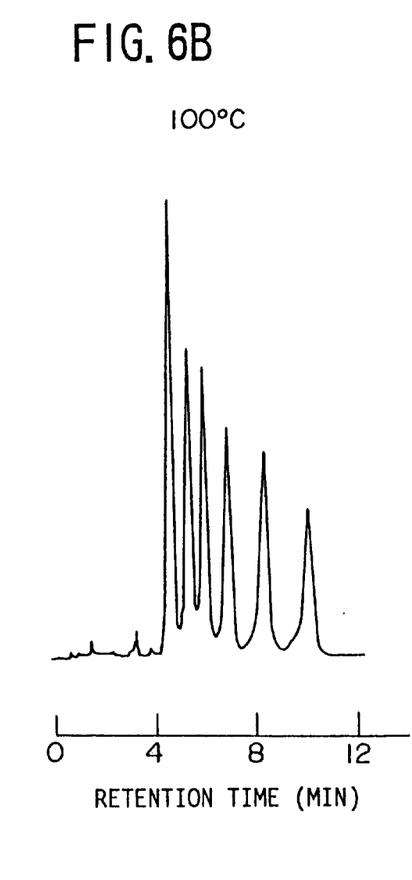

FIGS. 6A and 6B show the chromatograms obtained by the present experiment respectively for the case in which the heating after the polymerization was conducted at 200° C. and for the case in which the heating was conducted at 100° C. Further, FIG. 6C shows the chromatogram obtained by the comparative experiment.

Figure 6C:
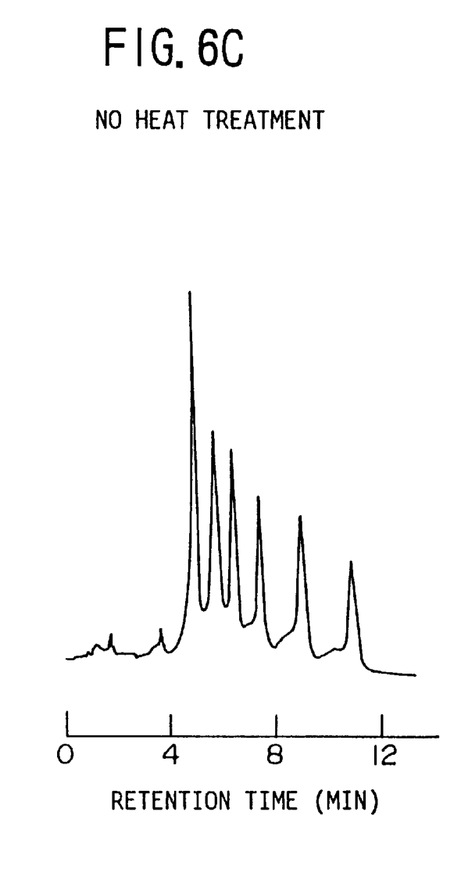

Referring to FIGS. 6A and 6B, it can be seen that sharp peaks are obtained in the present experiment as compared with the comparative experiment shown in FIG. 6C. This clearly indicates that the resolution of chromatography is higher in the packing material of the present experiment corresponding to the first embodiment as compared with the packing material of the comparative experiment.

[Experiment 4]

In the present experiment, the polymer particles obtained in the experiment 2, which uses the oxidation-reduction polymerization process, is subjected to a heat treatment process at 200° C. after the polymerization process, similarly to the experiment 3.

Next, a reversed phase chromatograph column is formed by filling the polymer packing material thus obtained in a column having an inner diameter of 4.6 mm and a length of 150 mm, and a specimen was analyzed by the chromatograph of FIG. 3 while using the reversed phase chromatograph column thus obtained for the column 14. Similarly as before, the specimen contained six alkylbenzene derivatives.

In the present experiment, a mixture of water and an acetonitrile solvent (60% acetonitrile) was used for the mobile phase and the mobile phase was supplied with a rate of 1.0 ml/min.

In order to confirm the effect of the polymer packing material of the third embodiment, a comparative experiment was undertaken also, in which a porous packing material was synthesized according to the process of the second experiment except that the heating process after the polymerization is eliminated. By using the polymer packing material of the comparative experiment, the same sample was analyzed by the chromatograph of FIG.3 under the same separation condition.

Figure 7A:
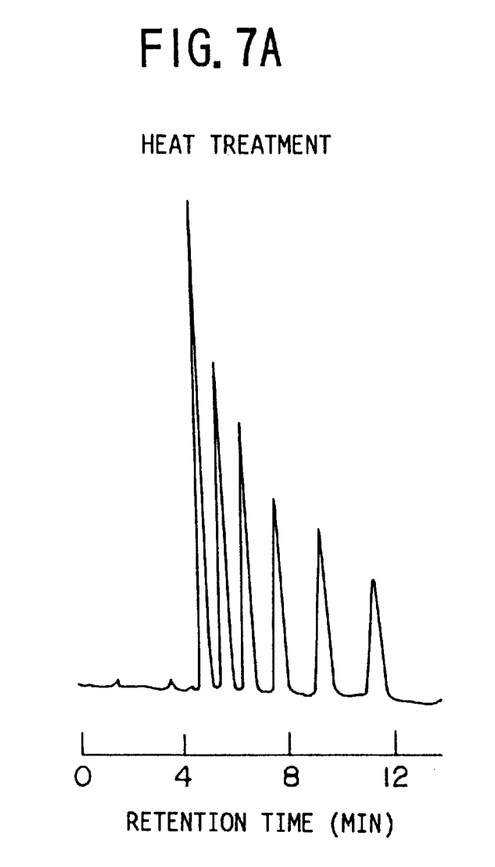
FIGS. 7A and 7B are diagrams showing the chromatogram obtained by a reversed phase liquid chromatography according to a fourth embodiment of the present invention in comparison with a conventional chromatogram.
Figure 7B:
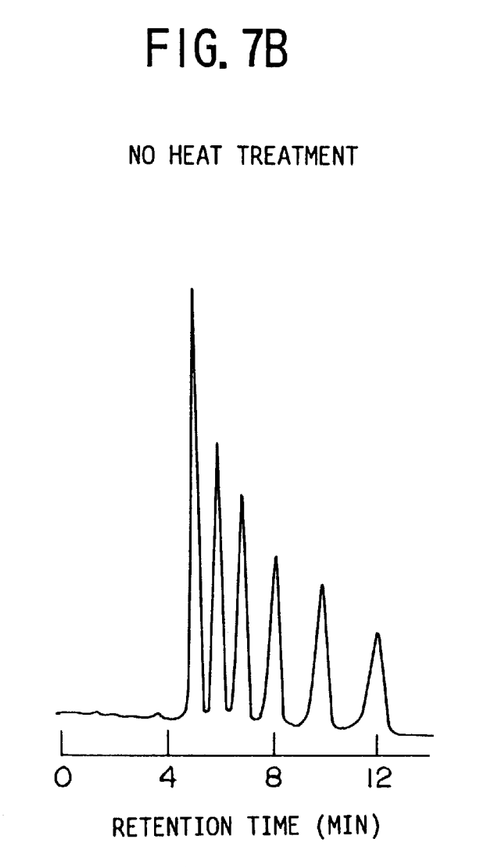

FIG. 7A shows the chromatograms obtained by the present experiment while FIG. 7B shows the chromatogram obtained by the comparative experiment.

Referring to FIG. 7A, it can be seen that sharp peaks are obtained in the present experiment as compared with the comparative experiment shown in FIG. 7B. This clearly indicates that the resolution of chromatography is higher in the packing material of the present experiment corresponding to the first embodiment as compared with the packing material of the comparative experiment.

What is claimed is:

1. A method of producing a polymer packing material for liquid chromatography, comprising the steps of:

swelling polymer seeds by applying a swelling agent;

swelling said polymer seeds further by monomers and a diluent not reacting with said monomers, to form swelled particles; and polymerizing said monomers in said swelled particles to form porous polymer particles, said step of forming said porous polymer particles including a step of removing said diluent;

wherein said step of forming said swelled particles by said monomers and said diluent includes a step of adding, to said polymer seeds in addition to said monomers and said diluent, a compound not reacting with said monomers, said compound having a conjugated double bond and a molecular weight of about 100 to about 500.

2. A method as claimed in claim 1, wherein said compound is selected from a group consisting of an aromatic hydrocarbon and an aromatic hydrocarbon having a substituent.

3. A method as claimed in claim 2, wherein said aromatic hydrocarbon includes naphthalene, anthracene, and pyrene.

4. A method as claimed in claim 2, wherein said aromatic hydrocarbon having a substituent has one of a naphthalene skeleton, an anthracene skeleton, a pyrene skeleton and a benzene skeleton.

5. A method as claimed in claim 2, wherein said aromatic hydrocarbon includes biphenyl and terphenyl.

6. A method as claimed in claim 2, wherein said substituent is selected from an aryl group and a halogen group.

7. A method as claimed in claim 2, wherein said substituent contains a heteroatom.

8. A method as claimed in claim 1, further comprising a step of applying a heat treatment process to said porous polymer particles at a temperature of about 100° C. or higher after said polymerization step.

9. A method as claimed in claim 1, wherein ethylene diacrylate is used for said monomers.

10. A method of producing a polymer packing material for liquid chromatography, comprising the steps of:

swelling polymer seeds by applying a swelling agent;

swelling said polymer seeds further by monomers and a diluent not reacting with said monomers, to form swelled particles; and polymerizing said monomers in said swelled particles to form porous polymer particles, said step of forming said porous polymer particles including a step of removing said diluent;

wherein said step of forming said swelled particles by said monomers and said diluent includes a step of adding, to said polymer seeds in addition to said monomers and said diluent, a compound not reacting with said monomers, said compound having a conjugated double bond and a molecular weight of about 100 to about 500;

wherein said step of polymerizing said monomers is conducted by an oxidation-reduction polymerization process.

11. A method as claimed in claim 10, wherein said oxidation-reduction polymerization process is conducted by using a metallic ion in a reduced state as a reductant.

12. A method as claimed in claim 11, wherein said metallic ion includes $Fe^{2+}$, $Cu^+$, $Cr^+$ and $Ti^{3+}$.

13. A method as claimed in claim 10, further comprising a step of applying a heat treatment to said porous polymer particles at a temperature of about 100° C. or higher, after said polymerization step.

14. A method as claimed in claim 13, wherein said heat treatment process is conducted at about 200° C.

* * * * *